(12) United States Patent
Park et al.

(10) Patent No.: US 11,921,554 B2
(45) Date of Patent: Mar. 5, 2024

(54) APPARATUS AND METHOD FOR DYNAMIC THERMAL MANAGEMENT USING FREQUENCY CLAMPING AND IDLE INJECTION

(71) Applicant: SAMSUNG ELECTRONICS CO., LTD., Suwon-si (KR)

(72) Inventors: Jong-Lae Park, Anyang-si (KR); Bumgyu Park, Suwon-si (KR); Hanjun Shin, Seoul (KR); Daeyeong Lee, Yongin-si (KR); Choonghoon Park, Suwon-si (KR); Dahye Choi, Hwaseong-si (KR); Donghee Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/718,699

(22) Filed: Apr. 12, 2022

(65) Prior Publication Data
    US 2023/0071918 A1    Mar. 9, 2023

(30) Foreign Application Priority Data
    Sep. 9, 2021    (KR) .......................... 10-2021-0120607

(51) Int. Cl.
    | | |
    |---|---|
    | *G06F 1/20* | (2006.01) |
    | *G06F 1/03* | (2006.01) |
    | *G06F 1/324* | (2019.01) |
    | *G06F 1/3296* | (2019.01) |

(52) U.S. Cl.
    CPC ............... *G06F 1/206* (2013.01); *G06F 1/03* (2013.01); *G06F 1/324* (2013.01); *G06F 1/3296* (2013.01)

(58) Field of Classification Search
    CPC ........................................................ G06F 1/206
    See application file for complete search history.

(56) References Cited

U.S. PATENT DOCUMENTS

| | | |
|---|---|---|
| 7,086,058 B2 | 8/2006 | Luick |
| 7,237,129 B2 | 6/2007 | Fung |
| 7,353,409 B2 | 4/2008 | Hartman et al. |
| (Continued) | | |

FOREIGN PATENT DOCUMENTS

| | | | |
|---|---|---|---|
| KR | 10-2006-0017333 | 2/2006 | |
| KR | 10-1261354 | 5/2013 | |
| TW | 200406668 A | * 5/2004 | ............. G01K 1/026 |

*Primary Examiner* — Suresh Suryawanshi
(74) *Attorney, Agent, or Firm* — F. CHAU & ASSOCIATES, LLC

(57) ABSTRACT

Disclosed is an apparatus for dynamic thermal management, which includes a thermal management unit that determines whether there is a need to perform thermal management on a processor based on temperatures measured from a plurality of temperature sensors included in the processor and generates an indication signal, and a controller that performs the thermal management on the processor in response to the indication signal, by using a first method of adjusting a state of each of a plurality of cores included in the processor, a second method of adjusting a level of an operating voltage and a frequency of a clock signal, which are provided to the processor, and/or a third method for adjusting only the frequency of the clock signal to be provided to the processor, and where each of the plurality of cores is in a wake-up state or an idle state.

20 Claims, 10 Drawing Sheets

(56) References Cited

U.S. PATENT DOCUMENTS

| | | | |
|---|---|---|---|
| 8,489,745 | B2 | 7/2013 | Mandagere et al. |
| 8,786,449 | B1* | 7/2014 | Kraipak ................. G06F 1/206 |
| | | | 702/132 |
| 9,063,713 | B2 | 6/2015 | Sumpter |
| 9,317,090 | B2 | 4/2016 | Culbert et al. |
| 9,329,670 | B2 | 5/2016 | Allen-Ware et al. |
| 9,552,046 | B2 | 1/2017 | Chang et al. |
| 9,977,439 | B2 | 5/2018 | Park et al. |
| 10,031,180 | B2 | 7/2018 | Chinnakkonda Vidyapoornachary et al. |
| 2005/0049729 | A1* | 3/2005 | Culbert ................... G06F 1/324 |
| | | | 713/340 |
| 2009/0290625 | A1* | 11/2009 | Riddle .................... G06F 1/206 |
| | | | 714/752 |
| 2010/0205464 | A1* | 8/2010 | Rotem ................ G06F 11/3058 |
| | | | 713/300 |
| 2016/0291653 | A1* | 10/2016 | Vootukuru ............. G01K 7/427 |
| 2017/0220445 | A1* | 8/2017 | Cunningham .......... G06F 1/206 |
| 2021/0109587 | A1 | 4/2021 | Mukker et al. |

* cited by examiner

FIG. 3A

LUT1

| Temperature(T) | Max Power Budget |
|---|---|
| T>TC5 | P6 |
| TC4<T≤TC5 | P5 |
| TC3<T≤TC4 | P4 |
| TC2<T≤TC3 | P3 |
| TC1<T≤TC2 | P2 |
| T≤TC1 | P1 |

LUT2

| Frequency and Voltage Level | Max Power Budget |
|---|---|
| F6, V6 | P6 |
| F5, V5 | P5 |
| F4, V4 | P4 |
| F3, V3 | P3 |
| F2, V2 | P2 |
| F1, V1 | P1 |

F1<F2<F3<F4<F5<F6, V1<V2<V3<V4<V5<V6
P1<P2<P3<P4<P5<P6

APPARATUS AND METHOD FOR DYNAMIC THERMAL MANAGEMENT USING FREQUENCY CLAMPING AND IDLE INJECTION

CROSS-REFERENCE TO RELATED APPLICATION

This application claims priority under 35 U.S.C. § 119 to Korean Patent Application No. 10-2021-0120607 filed on Sep. 9, 2021, in the Korean Intellectual Property Office, the disclosure of which is incorporated by reference herein in its entirety.

TECHNICAL FIELD

Embodiments of the present disclosure described herein relate to an electronic device, and more particularly, relate to an apparatus and a method for dynamic thermal management using frequency clamping and idle injection.

DISCUSSION OF THE RELATED ART

There has been a recent increase in the use of battery-powered electronic devices among users. For example, users may interact with laptops, smart phones, virtual reality headsets, and the like which may be collectively referred to as "mobile devices."

In order to provide extended usability between charges, and to provide safety to the user, these devices are designed with power usage and heat management systems. A mobile device uses an output voltage of a battery as an operating voltage and is in close contact with a user. After prolonged use and/or high powered use of a device, there is a need to prevent low temperature burn injuries to a user due to heat, to prevent an increase in power consumption due to an increase in thermal resistance, and to prevent physical and/or chemical damage to the components of the device. These needs are not limited to mobile devices, and need to be considered in devices supplied with external power as well.

SUMMARY

Embodiments of the present disclosure provide an apparatus and a method for dynamic thermal management, the apparatus and method capable of minimizing a reduction in performance by using frequency clamping and idle injection.

According to an embodiment, an apparatus for dynamic thermal management includes a thermal management unit that determines whether there is a need to perform thermal management on a processor, based on temperatures measured from a plurality of temperature sensors included in the processor and generates an indication signal based on the determination, and a controller that performs the thermal management on the processor in response to the indication signal, wherein the controller is configured to execute a first method of adjusting a state of each of a plurality of cores included in the processor, a second method of adjusting a level of an operating voltage and a frequency of a clock signal, which are provided to the processor, and a third method of adjusting only the frequency of the clock signal to be provided to the processor, wherein the controller performs the thermal management using at least one of the first, second, or third methods, and wherein each of the plurality of cores is in a wake-up state or an idle state.

According to an embodiment, a method for dynamic thermal management includes determining whether there is a need to perform thermal management on a processor, based on temperatures measured from a plurality of temperature sensors included in the processor, outputting an indication signal based the determination, and performing the thermal management on the processor in response to the indication signal, by using at least one of the following methods: a first method of adjusting a state of each of a plurality of cores included in the processor, a second method of adjusting a level of an operating voltage and a frequency of a clock signal, which are provided to the processor, and/or a third method of adjusting only the frequency of the clock signal to be provided to the processor. Each of the plurality of cores is in a wake-up state or an idle state.

According to an embodiment, a mobile device includes a processor that includes a plurality of cores and a plurality of temperature sensors, a thermal management unit that determines whether there is a need to perform thermal management on the processor, based on temperatures measured from the plurality of temperature sensors and generates an indication signal, a power management unit that provides powers to the plurality of cores, respectively, a PMIC that provides an operating voltage to the processor, a clock management unit that provides a clock signal to the processor, and a controller configured to perform the thermal management on the processor in response to the indication signal, wherein the controller is configured to execute a first method for adjusting a state of each of the plurality of cores included in the processor, a second method for adjusting a level of an operating voltage and a frequency of a clock signal, and a third method for adjusting only the frequency of the clock signal, wherein the controller performs the thermal management using at least one of the first, second, or third methods. Each of the plurality of cores is in a wake-up state or an idle state.

BRIEF DESCRIPTION OF THE DRAWINGS

The above and other objects and features of the present disclosure will become apparent by describing in detail embodiments thereof with reference to the accompanying drawings.

FIG. 3A illustrates an example of a look-up table storing a max power budget corresponding to information about temperatures.

FIG. 3B illustrates an example of a look-up table storing a max power budget corresponding to a level of an operating voltage and a frequency of a clock signal, which are provided to a processor.

DETAILED DESCRIPTION OF THE EMBODIMENTS

Figure 1:
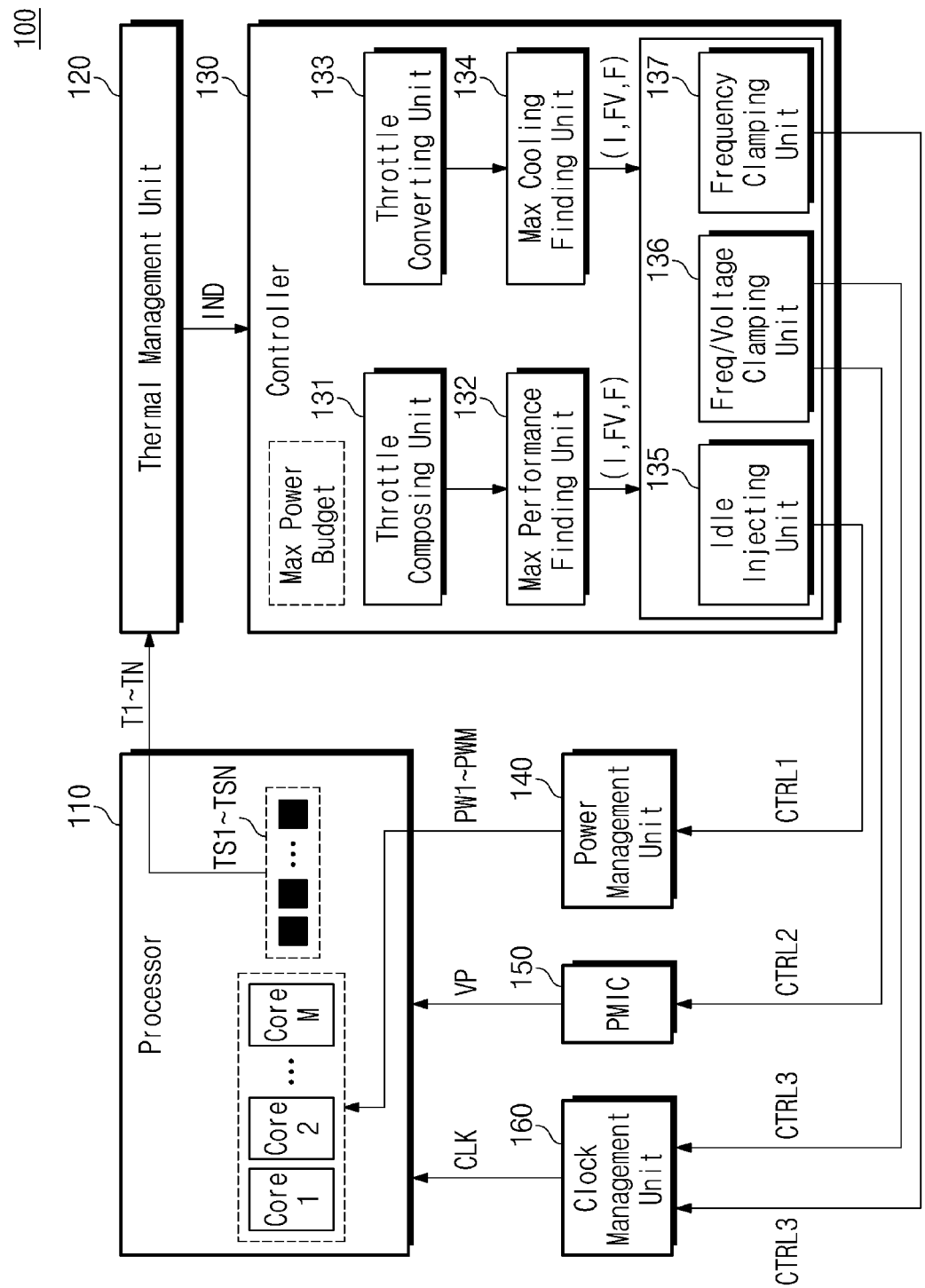
FIG. 1 is a block diagram that illustrates a configuration of a system for dynamic thermal management, according to an embodiment of the present disclosure.

Hereinafter, example embodiments of the present inventive concept will be described with reference to the accompanying drawings. Like reference symbols in the drawings may denote like elements, and to the extent that a description of an element has been omitted, it may be understood that the element is at least similar to corresponding elements that are described elsewhere in the specification.

In the detailed description, components described with reference to the terms "unit", "module", "block", "~er or ~or", etc. and function blocks illustrated in drawings may be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Conventional systems may provide heat management systems using a dynamic voltage and frequency scaling (DVFS) technique for dynamically adjusting an operating frequency and an operating voltage depending on an operating state of the mobile device is being introduced. However, fine frequency adjustment is impossible due to the granularity between frequencies. Also, in the case where a static power is larger than a dynamic power of the mobile device, a decrease in an operating frequency in a specific frequency zone (or range) may result in greater power consumption.

The present disclosure describes systems and methods for thermal and power management which minimize a reduction in performance.

FIG. 1 is a block diagram that illustrates a configuration of a system 100 for dynamic thermal management, according to an embodiment of the present disclosure. For example, the system 100 may be implemented as a part of a mobile device. For example, the mobile device may be a laptop computer, a smartphone, a tablet PC, personal digital assistant (PDA), a digital camera, a portable multimedia player (PMP), a portable game console, a wearable device, an Internet of Things (IoT) device, and the like, but is not limited thereto.

For example, the system 100 may be implemented as an integrated circuit (IC), a system on chip (SoC), an application processor (AP), a mobile AP, a chip set, or a set of semiconductor chips on the above mobile device, but the present disclosure is not limited thereto.

The system 100 may include a processor 110, a thermal management unit 120, a controller 130, a power management unit 140, a power management integrated circuit (PMIC) 150, and a clock management unit 160. The system 100 of the present disclosure may dynamically control the heat generation of the processor 110 by controlling the power management unit 140, the PMIC 150, and the clock management unit 160 through the thermal management unit 120 and the controller 130 based at least in part on an internal temperature of the processor 110.

The processor 110 may execute software (e.g., an application program, an operating system (OS), and/or a device driver) to be driven in the system 100. For example, the processor 110 may be a central processing unit (CPU) or a graphics processing unit (GPU), but the present disclosure is not limited thereto. The processor 110 may operate by using an operating voltage VP provided from the PMIC 150 and a clock signal CLK provided from the clock management unit 160.

The processor 110 may be a multi-core processor including a plurality of cores Core 1 to Core M, and the number of cores may vary according to embodiments. Each of the plurality of cores Core 1 to Core M may perform at least one task. The plurality of cores Core 1 to Core M may be homogeneous processor cores or may be heterogeneous processor cores. For example, the processor 110 may be a homogeneous multi-core processor or a heterogeneous multi-core processor. The plurality of cores Core 1 to Core M may be respectively controlled through powers PW1 to PWM supplied from the power management unit 140.

Each of the plurality of cores Core 1 to Core M may be in a wake-up state or an idle state. Herein, the wake-up state may refer to a state in which a core is performing a task and/or to a state in which a core is able to operate as soon as a task is allocated thereto. For example, the wake-up state may mean a state in which a level of a power being supplied to a core is a reference level or higher. The idle state may refer to a state in which a core is unable to operate as soon as a task is allocated thereto. For example, the idle state may mean a state in which a level of a power being supplied to a core is lower than the reference level. As the number of cores being in the idle state increases, the heat generation of the processor 110 may decrease.

Meanwhile, in some embodiments, the wake-up state or the idle state of each of the plurality of cores Core 1 to Core M may be identified according to whether a level of a clock applied to each core is a reference level or higher, or may be identified in consideration of both a clock level and a power level.

The plurality of cores Core 1 to Core M may operate independently of each other, and states of the plurality of cores Core 1 to Core M may also be independent of each other. For example, when the first core Core 1 is in the wake-up state, the second core Core 2 may be in the idle state. For example, when the first core Core 1 is in the wake-up state, it may mean that a first power PW1 being supplied to the first core Core 1 is at the reference level or higher. When the second core Core 2 is in the idle state, it may mean that a level of the second power PW2 being supplied to the second core Core 2 is lower than the reference level.

In an embodiment, each of the plurality of cores Core 1 to Core M may be classified a big core, a middle core, or a little core. The big core may be a high-power, high-performance core, in which power consumption is relatively high, and performance of processing a task is high (e.g., a processing speed is fast). The little core may be a low-power, low-performance core, in which power consumption is relatively low, and performance of processing a task is low (e.g., a processing speed is slow). For the middle core, power consumption may be smaller than that of the big core but may be greater than that of the little core, and performance of processing a task may be lesser than that of the big core but may be higher than that of the little core. Accordingly, a type (e.g., a big type, a middle type, or a little type) of a core may determine performance of the core. Accordingly, the performance of the processor 110 may be determined depending on the performance of each of the cores Core 1 to Core M.

The processor 110 may include a plurality of temperature sensors TS1 to TSN for measuring ambient temperatures of the cores Core 1 to Core M. For example, the temperature sensors TS1 to TSN may be disposed in or integrated around a hot spot of the cores Core 1 to Core M. The plurality of temperature sensors TS1 to TSN may not directly correspond 1:1 with the plurality of cores Core 1 to Core M. For example, the number of temperature sensors TS1 to TSN may be different from the number of cores Core 1 to Core M. Temperatures T1 to TN respectively measured by the plurality of temperature sensors TS1 to TSN may be provided to the thermal management unit 120. The temperatures T1 to TN measured by the temperature sensors TS1 to TSN may be used as criteria for dynamic thermal management.

The thermal management unit 120 may generate an indication signal IND capable of activating an operation of the controller 130, based on the temperatures T1 to TN respectively output from the temperature sensors TS1 to TSN. For example, the thermal management unit 120 may determine whether the controller 130 needs to control the heat generation of the processor 110 (e.g., may determine whether there is a need to cool the processor 110 through dynamic thermal management).

For example, the thermal management unit 120 may determine whether the controller 130 needs to perform thermal management on the processor 110, based on a highest, lowest, or average temperature of the temperatures T1 to TN output from the temperature sensors TS1 to TSN. Also, in some embodiments, the thermal management unit 120 may determine whether there is a need to perform thermal management on the processor 110, based on various combinations of the temperatures T1 to TN in a state where different weights are respectively applied to the temperatures T1 to TN, or may determine whether there is a need to perform thermal management by using only a specific temperature of the temperatures T1 to TN.

For convenience of description, below, a highest, lowest, or average temperature of the temperatures T1 to TN and/or various combinations of the temperatures T1 to TN are referred to as "information about the temperatures T1 to TN". When it is determined that the controller 130 needs to control the heat generation of the processor 110, the thermal management unit 120 may generate the indication signal IND for activating the operation of the controller 130.

The controller 130 may perform operations for controlling the heat generation of the processor 110, based on the indication signal IND provided from the thermal management unit 120. The controller 130 of the present disclosure may use three methods to control the heat generation of the processor 110. According to the first method, the controller 130 may control a state (e.g., the wake-up state or the idle state) of each of the plurality of cores Core 1 to Core M. According to the second method, the controller 130 may control a level of the operating voltage VP being supplied to the processor 110 and a frequency of the clock signal CLK being supplied to the processor 110 together. According to the third method, the controller 130 may control only the frequency of the clock signal CLK.

To control the heat generation of the processor 110, the controller 130 may use one of the first to third methods, or may use a combination thereof. The controller 130 may apply a weight to each method when combining the first to third methods. For example, each of the weights of the first to third methods may be a value between "0" and "1", and a sum of the weights may be "1".

In the following description and drawing, the weight applied to the first method, the weight applied to the second method, and the weight applied to the third method are marked by "I", "FV", and "F" respectively. For example, the "I" symbol may symbolize the modification of a current or Idle state in the first method (e.g. idle injection), the "FV" symbol may symbolize the modification of frequency and voltage in the second method, and the "F" symbol may symbolize the modification of frequency in the third method. For example, an expression such as (I, FV, F) may indicate the weights respectively applied to the first to third methods. The weights respectively applied to the methods may determine control signals CTRL1 to CTRL3 that are generated from the controller 130. As such, the powers PW1 to PWM, the level of the operating voltage VP, and the frequency of the clock signal CLK may be differently adjusted depending on the weights.

When determining whether to perform dynamic thermal management by using any method (e.g., when determining the weights), the controller 130 may preferentially maximize the performance of the processor 110 or may preferentially maximize the cooling of the processor 110. In the case of preferentially maximizing the performance of the processor 110, the controller 130 may determine the weights (I, FV, F) based on operations of a throttle composing unit 131 and a max performance finding unit 132. In the case of preferentially maximizing the cooling of the processor 110, the controller 130 may determine the weights (I, FV, F) based on operations of a throttle converting unit 133 and a max cooling finding unit 134.

In addition, the controller 130 may store and use information about a max power budget. The max power budget may indicate a max power that is available to the processor 110 for performing various functions. For example, the controller 130 may include a look-up table that stores the max power budget corresponding to the information about the temperatures T1 to TN. Additionally or alternatively, the controller 130 may include a look-up table that stores a level of the operating voltage VP and a frequency of the clock signal CLK, which are provided to the processor 110, and a max power budget corresponding thereto. However, the present disclosure is not limited thereto. The controller 130 may store the information about the max power budget in various methods, such as storing a configurable calculation for determining the max power budget.

First, in the case where a method for dynamic thermal management is determined in order to maximize the performance of the processor 110, the throttle composing unit 131 may generate a plurality of thermal management methods by outputting possible combinations of the weights (I, FV, F) based on the max power budget. For example, the throttle composing unit 131 may allow only the first method to be used as the thermal management method (e.g., (I, FV, F)=(1, 0, 0)); the throttle composing unit 131 may allow only the second method to be used as the thermal management method (e.g., (I, FV, F)=(0, 1, 0)); or the throttle composing unit 131 may allow only the third method to be used as the thermal management method (e.g., (I, FV, F)=(0, 0, 1)). The throttle composing unit 131 may assign other weights as well, and may allow the first method and the second method to be used together as the thermal management method (e.g., (I, FV, F)=(0.5, 0.5, 0)); the throttle composing unit 131 may allow the first method and the third method to be used together as the thermal management method (e.g., (I, FV, F)=(0.5, 0, 0.5)).

Based on the max power budget, the throttle composing unit 131 may output, as a combination of the weights (I, FV, F), various possible combinations capable of using, 1) a method (e.g., the first method) for controlling states of the plurality of cores Core 1 to Core M, 2) a method (e.g., the second method) for controlling both the level of the operating voltage VP and the frequency of the clock signal CLK, which are provided to the processor 110, and 3) a method (e.g., the third method) for controlling only the frequency of the clock signal CLK independently or together as the thermal management method.

The throttle composing unit 131 may provide the combinations of the weights (I, FV, F) to the max performance finding unit 132. The max performance finding unit 132 may find and determine a combination capable of maximizing the performance of the processor 110 from various combinations of the weights (1, FV, F) provided from the throttle composing unit 131. The max performance finding unit 132 may provide the determined weights "I", FV, and "F" to an idle injecting unit 135, a frequency/voltage clamping unit 136, and a frequency clamping unit 137, respectively.

In the case where dynamic thermal management is performed to maximize the cooling of the processor 110, the throttle converting unit 133 may output combinations of the weights (I, FV, F) based on the look-up table, the look-up table indicating the max power budget corresponding to the level of the operating voltage VP and the frequency of the clock signal CLK. For example, the throttle converting unit 133 may generate a plurality of thermal management methods by converting the level of the operating voltage VP and the frequency of the clock signal CLK corresponding to each power, into a corresponding combination of the weights (I, FV, F).

For example, a max power when the controller 130 controls the heat generation of the processor 110 based on the weights (I, FV, F) output by the throttle converting unit 133 may be the same as a max power when the level of the operating voltage VP and the frequency of the clock signal CLK were provided to the processor 110. In other words, the performance of the processor 110 that operates based on the weights (I, FV, F) output by the throttle converting unit 133 may be similar or equivalent to the performance of the processor 110 that operates based on the operating voltage VP and the clock signal CLK corresponding thereto.

The throttle converting unit 133 may provide the max cooling finding unit 134 with the combinations of the weights (I, FV, F) thus converted. The max cooling finding unit 134 may find and determine a combination capable of maximizing the cooling of the processor 110 from various combinations of the weights (I, FV, F) provided from the throttle converting unit 133. The max cooling finding unit 134 may provide the determined weights "I", FV, and "F" to the idle injecting unit 135, the frequency/voltage clamping unit 136, and the frequency clamping unit 137, respectively.

The idle injecting unit 135 may receive the weight "I" associated with the first method from the max performance finding unit 132 and/or the max cooling finding unit 134. The idle injecting unit 135 may determine a state of the plurality of cores Core 1 to Core M, based on the weight "1", and may generate the first control signal CTRL1 for controlling an output of the power management unit 140 (e.g., the powers PW1 to PWM to be respectively supplied to the cores Core 1 to Core M).

The frequency/voltage clamping unit 136 may receive the weight "FV" associated with the second method from the max performance finding unit 132 and/or the max cooling finding unit 134. The frequency/voltage clamping unit 136 may determine a maximum value of the level of the operating voltage VP and of the frequency of the clock signal CLK, which are to be provided to the processor 110, based on the weight "FV", and may generate the second control signal CTRL2 for controlling an output of the PMIC 150 (e.g., the operating voltage VP to be provided to the processor 110) and the third control signal CTRL3 for controlling an output of the clock management unit 160 (e.g., the clock signal CLK to be provided to the processor 110).

The frequency clamping unit 137 may receive the weight "F" associated with the third method from the max performance finding unit 132 and/or the max cooling finding unit 134. The frequency clamping unit 137 may determine a maximum value of the frequency of the clock signal CLK to be provided to the processor 110 based on the weight "F", and may generate the third control signal CTRL3 for controlling the output of the clock management unit 160 (e.g., the clock signal CLK to be provided to the processor 110).

Accordingly, the thermals of the system 100 may be managed while prioritizing maintaining a maximum power and/or while prioritizing maintaining a maximum cooling using the components and methods described herein.

The power management unit 140 may increase or decrease levels of the powers PW1 to PWM to be respectively provided to each of the plurality of cores Core 1 to Core M of the processor 110 in response to the first control signal CTRL1. For example, a core provided with a power whose level is the reference level or higher may enter the wake-up state, and a core provided with a power whose level is lower than the reference level may enter the idle state. For example, in the case where the number of cores in the idle state increases, the heat generation of the processor 110 may decrease.

The PMIC 150 may increase or decrease the level of the operating voltage VP to be provided to the processor 110 in response to the second control signal CTRL2. For example, in the case where the level of the operating voltage VP decreases, the heat generation of the processor 110 may also decrease. The clock management unit 160 may increase or decrease the frequency of the clock signal CLK to be provided to the processor 110 in response to the third control signal CTRL3. For example, in the case where the frequency of the clock signal CLK decreases, the heat generation of the processor 110 may also decrease.

An example in which the system 100 of FIG. 1 includes one processor 110 is illustrated, but the present disclosure is not limited thereto. For example, the system 100 may include a plurality of processors. Each of the plurality of processors may also include a plurality of cores. In this case, the thermal management unit 120 may determine whether to need to perform thermal management on each processor based on information about temperatures measured from each processor and may transmit an indication signal corresponding to a determination result to the controller 130; the controller 130 may perform dynamic thermal management on each processor according to the methods described above.

Figure 2:
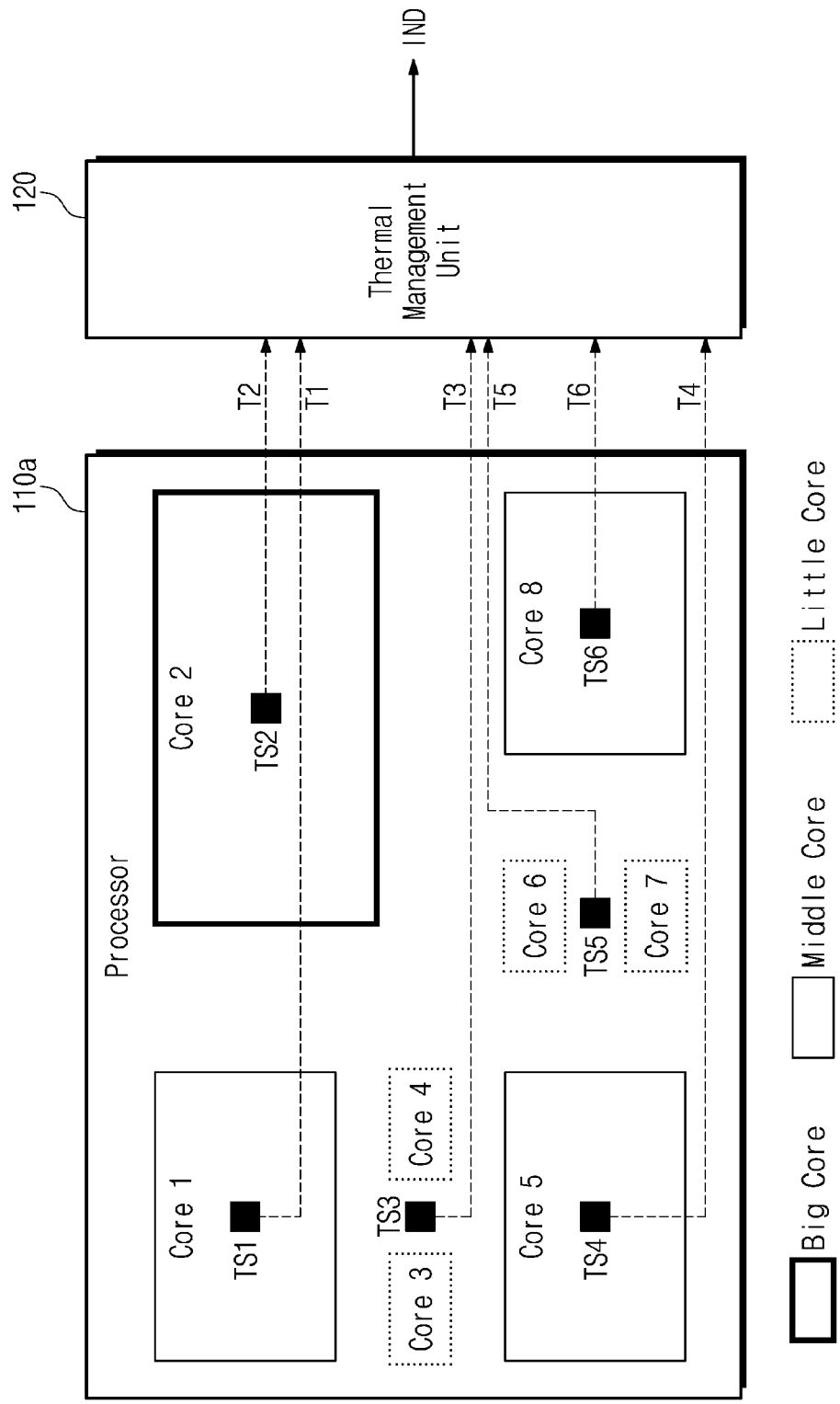
FIG. 2 illustrates an example of a configuration of a processor of FIG. 1.

FIG. 2 illustrates an example of a configuration of the processor 110 of FIG. 1. A processor 110a of FIG. 2 is illustrated as a multi-core processor including 8 cores Core 1 to Core 8 and 6 temperature sensors TS1 to TS6. As described with reference to FIG. 1, each of the cores Core 1 to Core 8 may perform tasks independently, and a state of each of the cores Core 1 to Core 8 (e.g., idle or wake-up state) may also be independent.

In drawing, a big core is depicted by a bold solid line, a middle core is depicted by a solid line, and a little core is depicted by a dotted line. Referring to FIG. 2, in an example embodiment, the second core Core 2 is a big core, the first core Core1, the fifth core Core 5, and the eighth core Core 8 re middle cores, and the third core Core 3, the fourth core Core 4, the sixth core Core 6, and the seventh core Core 7 are little cores.

As illustrated in FIG. 2, the first temperature sensor TS1, the second temperature sensor TS2, the fourth temperature sensor TS4, and the sixth temperature sensor TS6 are respectively included within the first core Core 1, the second core Core 2, the fifth core Core 5, and the eighth core Core 8. The third temperature sensor TS3 is placed between the third and fourth cores Core3 and Core 4, and the fifth temperature sensor TS5 is placed between the sixth and seventh cores Core6 and Core 7.

As described with reference to FIG. 1, the temperature sensor TS1 to TS6 may measure ambient temperatures T1 to T6 of the corresponding components (e.g., the cores Core 1 to Core 8) and may output the measured temperatures T1 to T6 to the thermal management unit 120. The thermal management unit 120 may determine whether there is a need to perform thermal management on the processor 110a based on the information about the temperatures T1 to T6 and may output the indication signal IND to the controller 130 of FIG. 1.

As described above, the processor 110a of FIG. 2 is one example of a configuration of the processor 110 of FIG. 1, and the present disclosure is not limited thereto. In another embodiment, the processor 110 of FIG. 1 may include a number cores that is different from that of the processor 110a illustrated in FIG. 2 and may include a number of temperature sensors that is different from that of the processor 110a illustrated in FIG. 2. In an embodiment, the kinds of cores of the processor 110 of FIG. 1 may be different from those of the processor 110a illustrated in FIG. 2, and the layout of temperature sensors of the processor 110 of FIG. 1 may be different from that of the processor 110a illustrated in FIG. 2.

FIG. 3A illustrates an example of a look-up table LUT1 storing a max power budget corresponding to information about temperatures, and FIG. 3B illustrates an example of a look-up table LUT2 storing a max power budget corresponding to a level of an operating voltage and a frequency of a clock signal, which are provided to a processor. As described above, the max power budget may indicate a max power that is allocated to a processor (e.g., 110 of FIG. 1) for performing various functions. Below, embodiments will be described with reference to FIG. 1 together with FIGS. 3A and 3B.

A temperature "T" of FIG. 3A may correspond to the information about the temperatures T1 to TN measured from the processor 110 (e.g., a highest temperature, a lowest temperature, or an average temperature of temperatures measured from a processor or one of various combinations of the temperatures). As illustrated in FIG. 3A, the max power budget of the processor may be set to one of P1 to P6 depending on a range of the temperature "T" and may be stored in the look-up table LUT1. For example, the max power budget, the levels corresponding to P1 to P6, and the look-up table LUT1 may be set and/or configured by a user or manufacturer. Of the temperatures TC1 to TC5 used as the criteria of the temperature "T", TC5 is the highest, and TC1 is the lowest (e.g., TC1<TC2<TC3<TC4<TC5); P6 of powers P1 to P6 is the greatest, and P1 thereof is the smallest (e.g., P1<P2<P3<P4<P5<P6).

For example, in the case where dynamic thermal management is performed under a condition to maximize the performance of the processor 110, the throttle composing unit 131 may set a target temperature intended to reach through thermal management with reference to the look-up table LUT1 of FIG. 3A, and may generate a combination of the weights (I, FV, F) based on a max power budget corresponding to the target temperature (for example, a max power budget corresponding to a range in which the target temperature is included).

Afterwards, the max performance finding unit 132 may select a combination capable of maximizing the performance of the processor 110 from combinations of the weights (I, FV, F) generated by the throttle composing unit 131, and may control the heat generation of the processor 110 through the idle injecting unit 135, the frequency/voltage clamping unit 136, and the frequency clamping unit 137.

In the case of performing dynamic thermal management through the throttle composing unit 131 and the max performance finding unit 132 with reference to the look-up table LUT1, the controller 130 may cool the processor 110 to an intended temperature and may simultaneously maximize the performance of the processor 110.

A frequency and a voltage level of FIG. 3B respectively indicate a frequency of the clock signal CLK and a level of the operating voltage VP, which are provided to the processor 110. F6 of frequencies F1 to F6 is the highest, and F1 thereof is the lowest (e.g., F1<F2<F3<F4<F5<F6). V6 of voltage levels V1 to V6 is the highest, and V1 thereof is the lowest (e.g., V1<V2<V3<V4<V5<V6). As illustrated in FIG. 3B, the max power budget of the processor may be set to one of P1 to P6 depending on a frequency and a voltage level, and may be stored in the look-up table LUT2. Similar to the look-up table LUT1 of FIG. 3A, P6 of powers P1 to P6 is the highest, and P1 thereof is the lowest (e.g., P1<P2<P3<P4<P5<P6).

For example, in the case where dynamic thermal management is performed under a condition to maximize the cooling of the processor 110, the throttle converting unit 133 may set a target power intended to reach through thermal management with reference to the look-up table LUT2 of FIG. 3B, and may convert a frequency and a voltage level corresponding to the target power into a combination of the weights (I, FV, F) allowing the processor 110 to operate to be equivalent to the target power.

Afterwards, the max cooling finding unit 134 may select a combination from combinations of the weights (I, FV, F) converted by the throttle converting unit 133 capable of maximizing the cooling of the processor 110, and may control the heat generation of the processor 110 through the idle injecting unit 135, the frequency/voltage clamping unit 136, and the frequency clamping unit 137.

In the case of performing dynamic thermal management through the throttle converting unit 133 and the max cooling finding unit 134 with reference to the look-up table LUT2, the controller 130 may maintain a power of the processor 110 at an intended target power and may simultaneously maximize the cooling of the processor 110.

Figure 4:
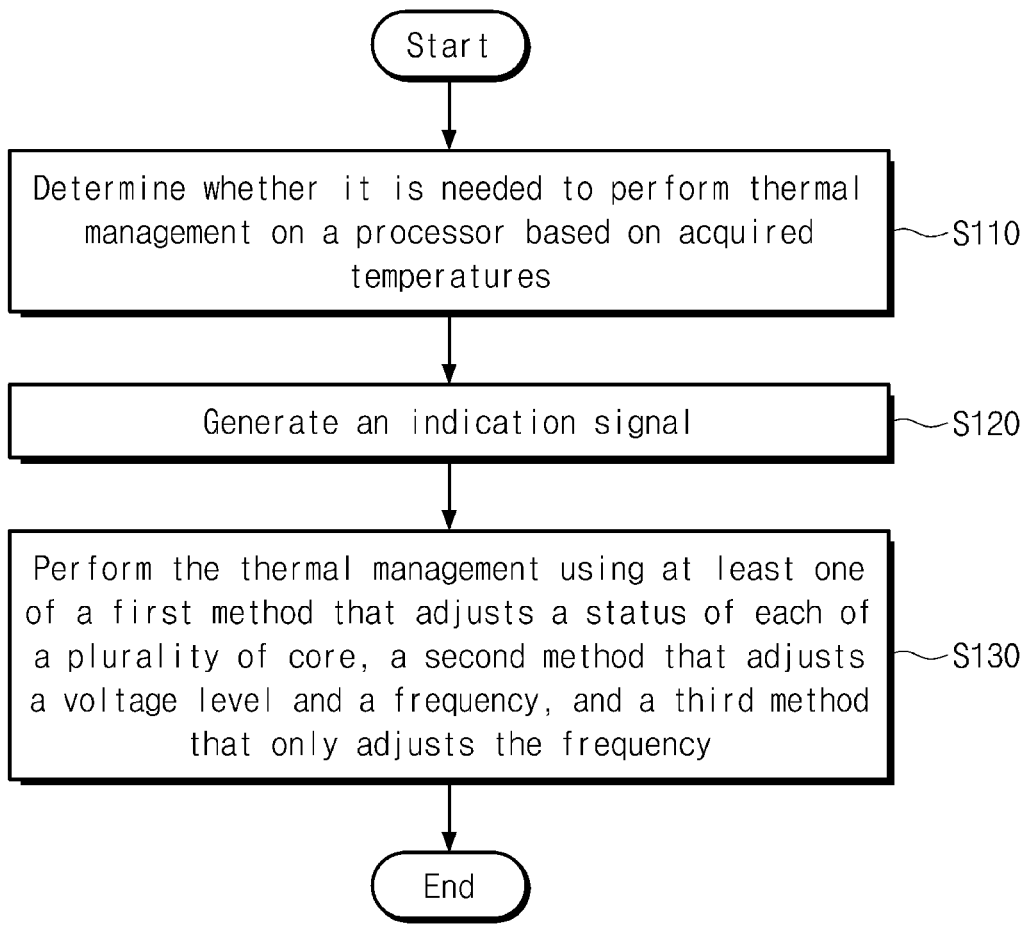
FIG. 4 is a flowchart that illustrates a dynamic thermal management method according to an embodiment of the present disclosure.

FIG. 4 is a flowchart that illustrates a dynamic thermal management method according to an embodiment of the present disclosure. Below, embodiments will be described with reference to FIG. 1 together with FIG. 4.

In operation S110, the thermal management unit 120 may determine whether there is a need to perform thermal management on the processor 110, based on the temperatures T1 to TN measured from the plurality of temperature sensors TS1 to TSN included with the processor 110. In operation S120, the thermal management unit 120 may output the indication signal IND capable of activating the operation of the controller 130, based on a determination result.

In operation S130, in response to the indication signal IND, the controller 130 may perform thermal management on the processor 110 by using at least one of the first method for adjusting a state (e.g., the wake-up state or the idle state) of each of the plurality of cores Core 1 to Core M included in the processor 110, the second method for adjusting the level of the operating voltage VP and the frequency of the clock signal CLK, which are provided to the processor 110, or the third method for adjusting only the frequency of the clock signal CLK that is provided to the processor 110.

Figure 5:
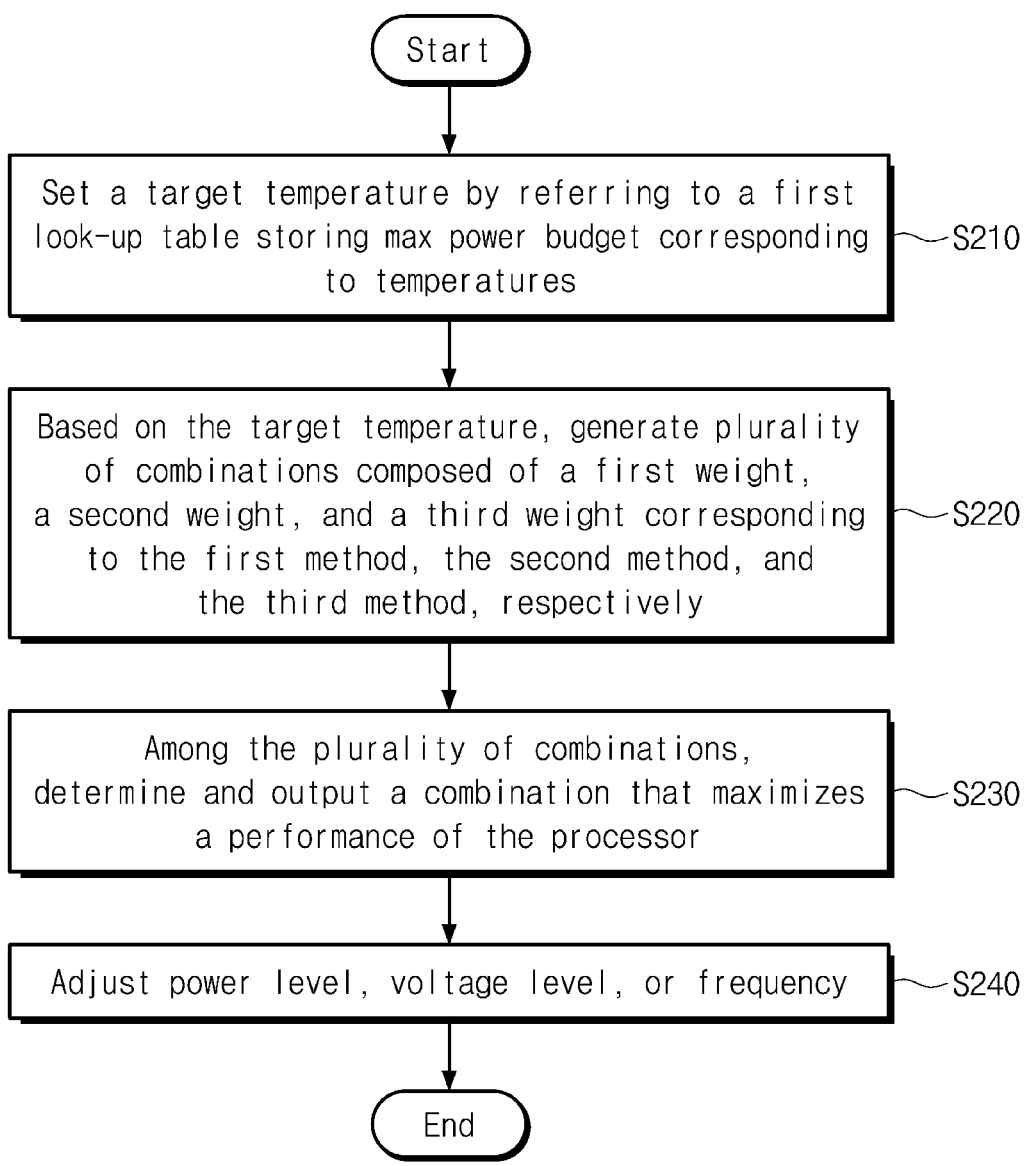
FIG. 5 is a flowchart that illustrates a dynamic thermal management method in which performance of a processor is preferentially maximized.

FIG. 5 is a flowchart that illustrates a dynamic thermal management method which prioritizes maximizing performance of a processor. For example, operations of FIG. 5 may be detail operations for performing operation S130 of FIG. 4. Below, the description will be given with reference to FIG. 1 together with FIG. 5.

In operation S210, the throttle composing unit 131 of the controller 130 may set a target temperature with reference to a first look-up table (e.g., LUT1 of FIG. 3A) which stores a max power budget of the processor corresponding to information about temperatures.

In operation S220, based on the target temperature, the throttle composing unit 131 may generate combinations of the weights (I, FV, F) corresponding to 1) a method (e.g., the first method) for controlling states of the plurality of cores Core 1 to Core M, 2) a method (e.g., the second method) for controlling both the level of the operating voltage VP and the frequency of the clock signal CLK, which are provided to the processor 110, and 3) a method (e.g., the third method) for controlling only the frequency of the clock signal CLK, so as to be provided to the max performance finding unit 132.

In operation S230, the max performance finding unit 132 may determine and output a combination capable of maximizing the performance of the processor 110 from various combinations of the weights (I, FV, F) provided from the throttle composing unit 131. In operation S240, based on the determined combination, the idle injecting unit 135, the frequency/voltage clamping unit 136, and the frequency clamping unit 137 may respectively output the first control signal CTRL1 for adjusting the levels of the powers PW1 to PWM to be provided to each of the plurality of cores Core 1 to Core M, the second control signal CTRL2 for adjusting the level of the operating voltage VP to be provided to the processor 110, and the third control signal CTRL3 for adjusting the frequency of the clock signal CLK to be provided to the processor 110.

Figure 6:
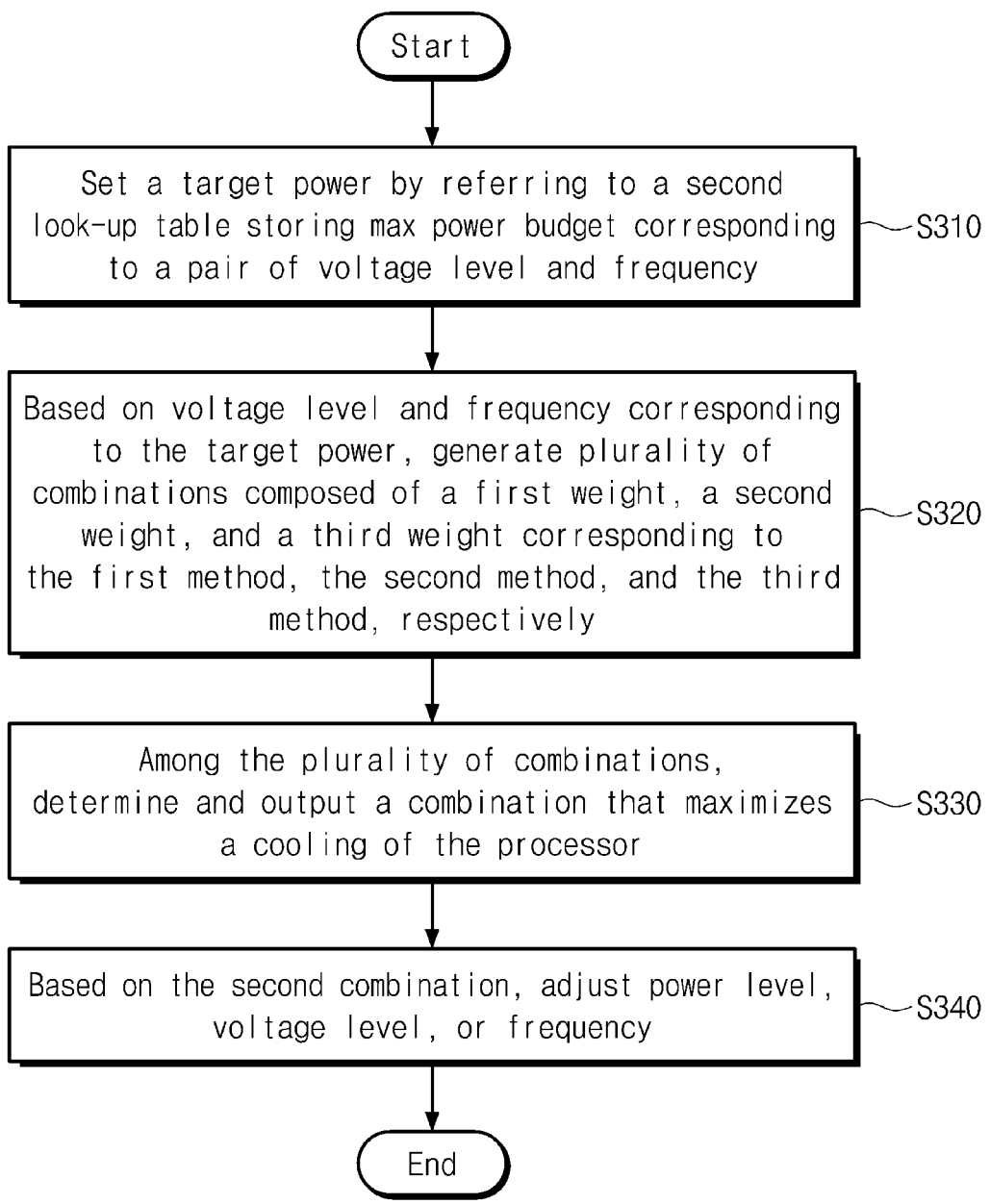
FIG. 6 is a flowchart that illustrates a dynamic thermal management method in which cooling of a processor is preferentially maximized.

FIG. 6 is a flowchart that illustrates a dynamic thermal management method which prioritizes maximizing cooling of a processor. For example, operations of FIG. 6 may be detail operations for performing operation S130 of FIG. 4. Below, the description will be given with reference to FIG. 1 together with FIG. 6.

In operation S310, the throttle converting unit 133 of the controller 130 may set a target power with reference to a second look-up table (e.g., LUT2 of FIG. 3B) which stores a max power budget corresponding to the level of the operating voltage VP and the frequency of the clock signal CLK, which are provided to the processor 110.

In operation S320, based on a voltage level and a frequency corresponding to the target power, the throttle converting unit 133 may generate combinations of the weights (I, FV, F) corresponding to 1) a method (e.g., the first method) for controlling states of the plurality of cores Core 1 to Core M, 2) a method (e.g., the second method) for controlling both the level of the operating voltage VP and the frequency of the clock signal CLK, which are provided to the processor 110, and 3) a method (e.g., the third method) for controlling only the frequency of the clock signal CLK, so as to be provided to the max cooling finding unit 134.

In operation S330, the max cooling finding unit 134 may determine and output a combination capable of maximizing the cooling of the processor 110 from various combinations of the weights (I, FV, F) provided from the throttle converting unit 133. In operation S340, based on the determined combination, the idle injecting unit 135, the frequency/voltage clamping unit 136, and the frequency clamping unit 137 may respectively output the first control signal CTRL1 for adjusting the levels of the powers PW1 to PWM to be provided to each of the plurality of cores Core 1 to Core M, the second control signal CTRL2 for adjusting the level of the operating voltage VP to be provided to the processor 110, and the third control signal CTRL3 for adjusting the frequency of the clock signal CLK to be provided to the processor 110.

For example, in operation S240 of FIG. 5 or operation S340 of FIG. 6, the idle injecting unit 135 may determine a state of each of the plurality of cores Core 1 to Core M based on the weight "I" and may generate the first control signal CTRL1 for increasing or decreasing the levels of the powers PW1 to PWM.

Also, in operation S240 of FIG. 5 or operation S340 of FIG. 6, the frequency/voltage clamping unit 136 may determine a maximum value of the level of the operating voltage VP and a maximum value of the frequency of the clock signal CLK based on the weight FV, and may generate the second control signal CTRL2 for increasing or decreasing the level of the operating voltage VP and the third control signal CTRL3 for increasing or decreasing the frequency of the clock signal CLK.

Finally, in operation S240 of FIG. 5 or operation S340 of FIG. 6, the frequency clamping unit 137 may determine a maximum value of the frequency of the clock signal CLK based on the weight "F", and may generate the third control signal CTRL3 for increasing or decreasing the frequency of the clock signal CLK.

Figure 7:
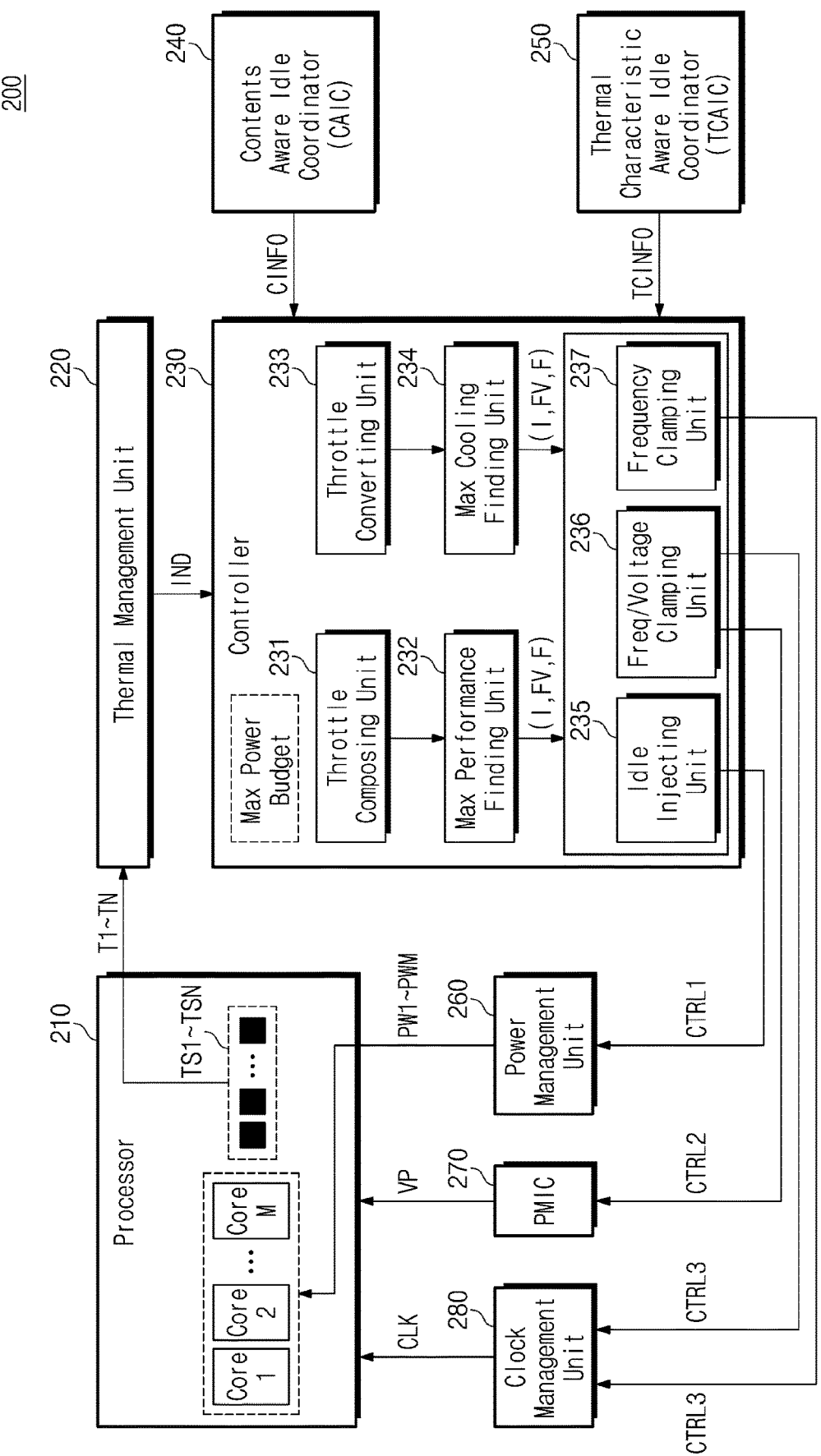
FIG. 7 is a block diagram that illustrates a configuration of a system for dynamic thermal management, according to another embodiment of the present disclosure.

FIG. 7 is a block diagram that illustrates a configuration of a system 200 for dynamic thermal management, according to another embodiment of the present disclosure. Like the system 100 of FIG. 1, the system 200 may dynamically control the heat generation of a processor 210 by controlling a power management unit 260, a PMIC 270, and a clock management unit 280 through a thermal management unit 220 and a controller 230 based on internal temperature of the processor 210.

In addition, the system 200 of FIG. 7 may include a contents aware idle coordinator (CAIC) 240 and a thermal characteristic aware idle coordinator (TCAIC) 250. The system 200 of FIG. 7 includes similar functionality to the system 100 of FIG. 1 except that the system 200 further includes the CAIC 240 and the TCAIC 250, and thus, additional description will be omitted to avoid redundancy.

The CAIC 240 may provide the controller 230 with contents information CINFO associated with contents of a task being performed in the processor 210. For example, the contents information CINFO may include information about a kind of a task (e.g., whether it is a game, music, or video reproduction), a minimum frequency required to perform the task, a duty time of the task, and a minimum power required to perform the task.

The contents information CINFO may affect the weights (I, FV, F) that are output by a max performance finding unit 232 or a max cooling finding unit 234. For example, when the frequency of the clock signal CLK determined by the weight FV or "F" is lower than the minimum frequency required to perform the task, the weight FV or "F" may be adjusted such that the frequency of the clock signal CLK has a value greater than the minimum frequency.

As another example, in the case where the duty time of the task is short and the short duty time is an important factor in performing the task, the adjustment of the frequency of the clock signal CLK may affect the execution of the task. Accordingly, in this case, rather than the adjustment of the frequency of the clock signal CLK, the adjustment of a state (e.g., the wake-up state or the idle state) of each of the cores Core 1 to Core M (e.g., the adjustment of the weight "I") may be more effective in controlling the heat generation of the processor 210.

In contrast, in the case where seamless task processing is required, the adjustment of each of the cores Core 1 to Core M from the wake-up state to the idle state may affect the execution of the task. Accordingly, in this case, the adjustment of the frequency of the clock signal CLK or the level of the operating voltage VP (e.g., the adjustment of the weight FV or "F") may be more effective in controlling the heat generation of the processor 210.

The TCAIC 250 may provide the controller 230 with thermal characteristic information TCINFO including thermal characteristics of a printed circuit board (PCB) in which the system 200 is implemented, a system on chip (SoC), and semiconductor devices that the system 200 includes.

For example, a temperature change in response to a time taken for each of the cores Core 1 to Core M of the processor 210 to enter the idle state from the wake-up state may vary depending on a thermal characteristic or a configuration of the PCB. Accordingly, the weight "I" may be additionally adjusted based on the thermal characteristic information TCINFO provided from the TCAIC 250, as well as the contents information CINFO.

Weight adjustment based on the contents information CINFO or the thermal characteristic information TCINFO may be additionally performed after a combination of the weights (I, FV, F) is determined by the max performance finding unit 232 and/or the max cooling finding unit 234. For example, in the case where there is a need to revise one of the levels of the powers PW1 to PWM, the level of the operating voltage VP, and the frequency of the clock signal CLK depending on the contents information CINFO or the thermal characteristic information TCINFO, the controller 230 may adjust the weights "I", FV, and "F" to determine a new combination of the weights (I, FV, F), and an idle injecting unit 235, a frequency/voltage clamping unit 236, and a frequency clamping unit 237 may output new control signals CTRL1 to CTRL3.

Figure 8:
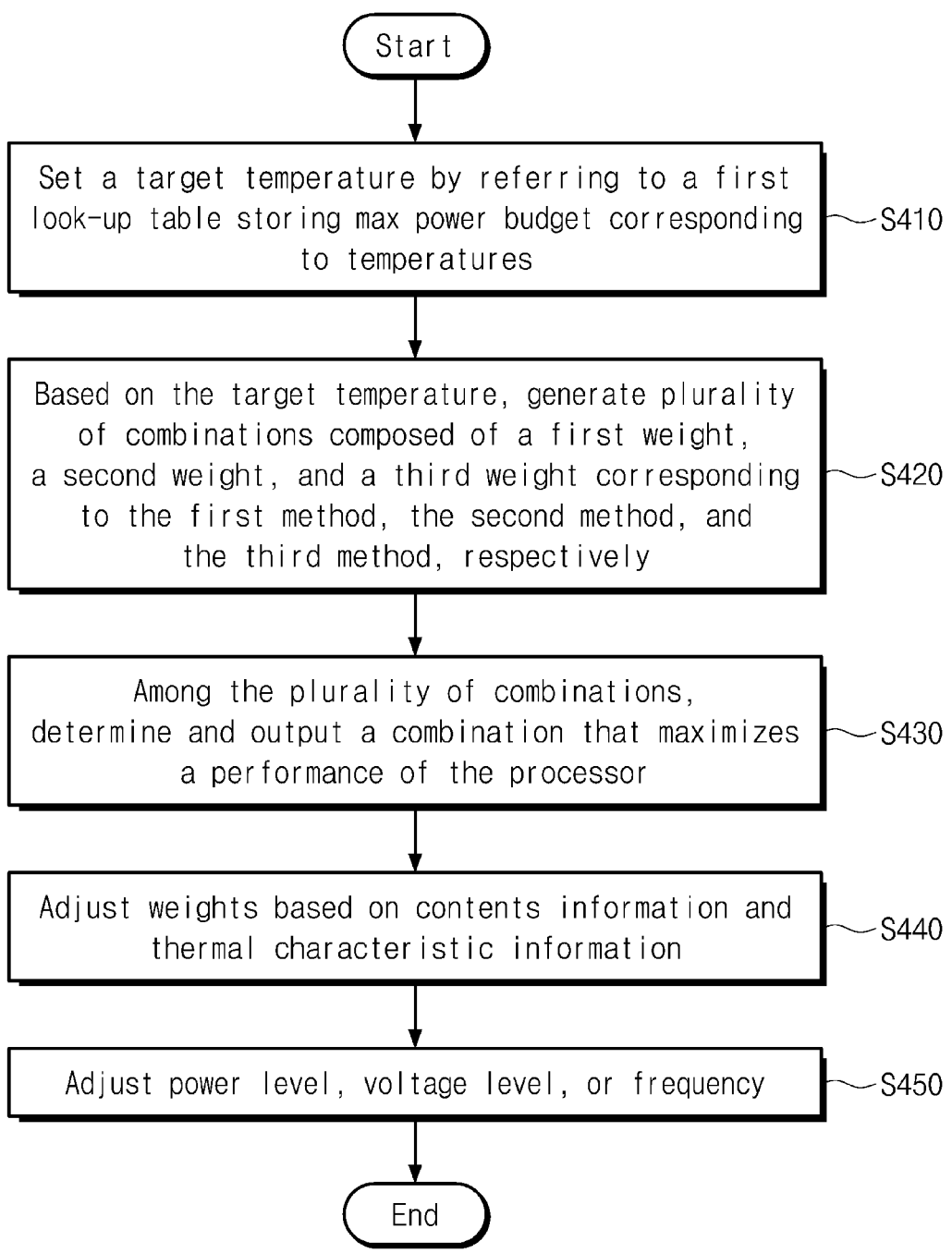
FIG. 8 is a flowchart that illustrates a dynamic thermal management method in which performance of a processor is preferentially maximized, according to another embodiment of the present disclosure.

FIG. 8 is a flowchart that illustrates a dynamic thermal management method which prioritizes maximizing performance of a processor according to another embodiment of the present disclosure. Below, the description will be given with reference to FIG. 7 together with FIG. 8. Operation S410, operation S420, and operation S430 of FIG. 8 are the same as or similar to operation S210, operation S220, and operation S230 of FIG. 5, and thus, additional description will be omitted to avoid redundancy.

In operation S440, the controller 230 may adjust the weights "I", FV, and "F" based on the contents information CINFO provided from the CAIC 240 and the thermal characteristic information TCINFO provided from the TCAIC 250. In operation S450, based on a combination of the weights (I, FV, F), the idle injecting unit 235, the frequency/voltage clamping unit 236, and the frequency clamping unit 237 may respectively generate the control signal CTRL1 for adjusting the levels of the powers PW1 to PWM, the control signal CTRL2 for adjusting the level of the operating voltage VP, and the control signal CTRL3 for adjusting the frequency of the clock signal CLK.

Figure 9:
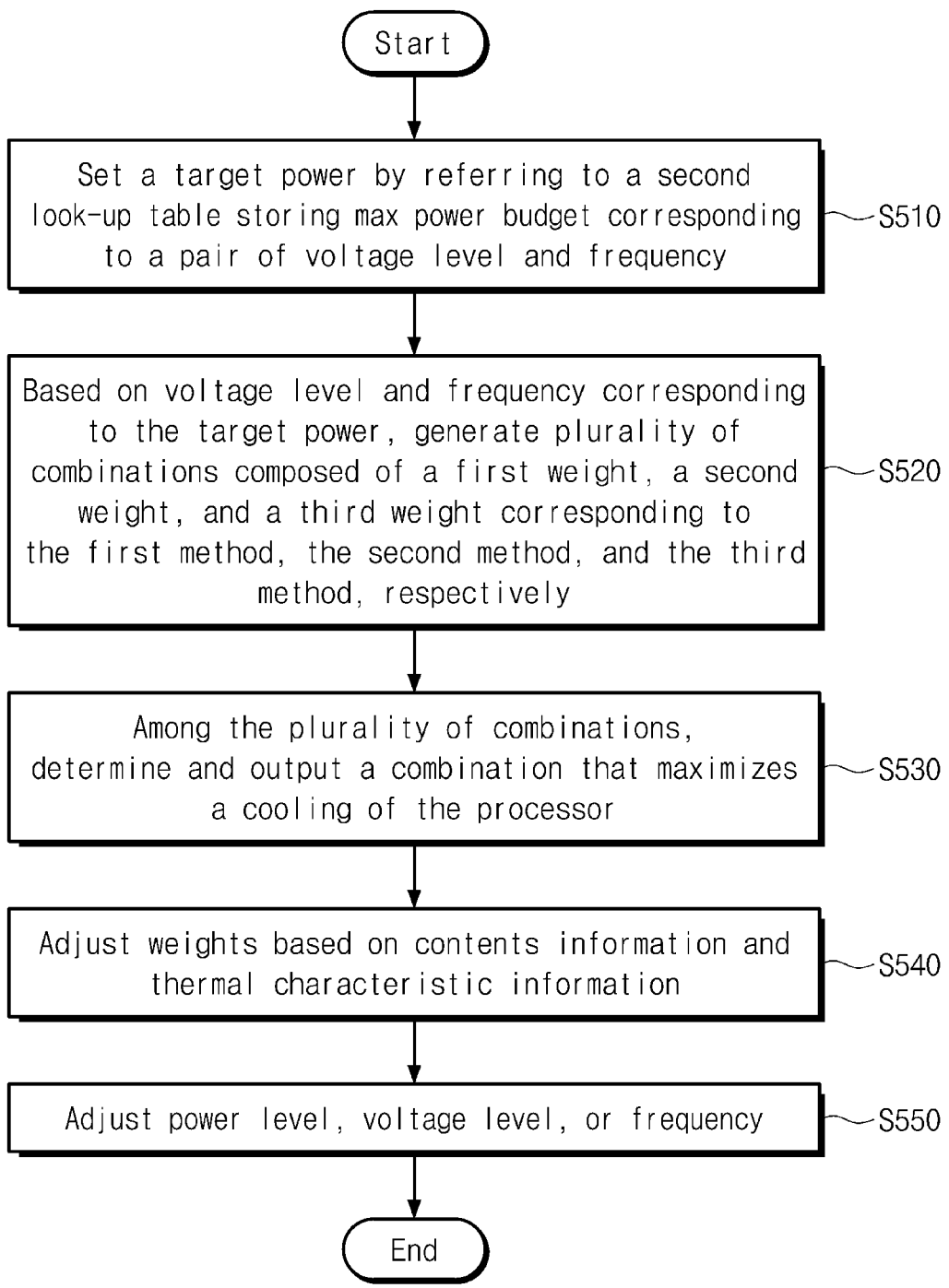
FIG. 9 is a flowchart that illustrates a dynamic thermal management method in which cooling of a processor is preferentially maximized, according to another embodiment of the present disclosure.

FIG. 9 is a flowchart that illustrates a dynamic thermal management method which prioritizes maximizing cooling of a processor according to another embodiment of the present disclosure. Below, the description will be given with reference to FIG. 7 together with FIG. 9. Operation S510, operation S520, and operation S530 of FIG. 9 are the same as or similar to operation S310, operation S320, and operation S330 of FIG. 6, and thus, additional description will be omitted to avoid redundancy.

Like operation S440 of FIG. 8, in operation S540, the controller 230 may adjust the weights "I", FV, and "F" based on the contents information CINFO provided from the CAIC 240 and the thermal characteristic information TCINFO provided from the TCAIC 250. In operation S550, based on a combination of the adjusted weights (I, FV, F), the idle injecting unit 235, the frequency/voltage clamping unit 236, and the frequency clamping unit 237 may each respectively generate the control signal CTRL1 for adjusting the levels of the powers PW1 to PWM, the control signal CTRL2 for adjusting the level of the operating voltage VP, and the control signal CTRL3 for adjusting the frequency of the clock signal CLK.

Operation S450 of FIG. 8 and operation S550 of FIG. 9 are the same as or similar to operation S240 of FIG. 5 and operation S340 of FIG. 6, and thus, additional description associated with the operations of the idle injecting unit 235, the frequency/voltage clamping unit 236, and the frequency clamping unit 237 will be omitted to avoid redundancy.

According to an embodiment of the present disclosure, it may be possible to minimize the reduction in performance of a processor and simultaneously maintain increased cooling through dynamic thermal management using frequency clamping and idle injection.

Also, according to an embodiment of the present disclosure, dynamic thermal management may be performed in consideration of a task being performed by a processor or thermal conductivity of a substrate constituting a semiconductor device.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An apparatus for dynamic thermal management, comprising:
   a thermal management unit configured to determine whether there is a need to perform thermal management on a processor, based on temperatures measured from a plurality of temperature sensors included in the processor, and to generate an indication signal based on the determination; and
   a controller configured to perform the thermal management on the processor in response to the indication signal, wherein the controller is configured to execute a first method of adjusting a state of each of a plurality of cores included in the processor, a second method of adjusting a level of an operating voltage and a frequency of a clock signal, which are provided to the processor, or a third method of adjusting only the frequency of the clock signal to be provided to the processor, wherein the controller performs the thermal management using at least one of the first, second, or third methods, and wherein each of the plurality of cores is in a wake-up state or an idle state, and wherein the thermal management methods used by the controller are based on a priority setting of the controller, the priority setting including a preferentially maximize performance setting and a preferentially maximize cooling setting.

2. The apparatus of claim 1, wherein the controller includes:
a first look-up table storing a max power budget of the processor corresponding to information about the temperatures; and
a second look-up table storing a max power budget of the processor corresponding to the level of the operating voltage and the frequency of the clock signal,
wherein the information about the temperatures is a highest temperature, a lowest temperature, or an average temperature of the temperatures.

3. The apparatus of claim 2, wherein the controller further includes:
a throttle composing unit configured to set a target temperature based on the first look-up table, and to generate a plurality of combinations, each composed of a first weight, a second weight, and a third weight respectively corresponding to the first method, the second method, and the third method, based on the target temperature;
a max performance finding unit configured to determine and output a combination maximizing performance of the processor from among the plurality of combinations;
an idle injecting unit configured to set the state of each of the plurality of cores based on the first weight of the combination and to generate a first control signal, wherein the control signal determines levels of power to be respectively provided to each of the plurality of cores;
a frequency/voltage clamping unit configured to determine a maximum value of the level of the operating voltage and a maximum value of the frequency of the clock signal based on the second weight of the combination, and to generate a second control signal adjusting the level of the operating voltage to be provided to the processor and a third control signal increasing or decreasing the frequency of the clock signal to be provided to the processor; and
a frequency clamping unit configured to determine the maximum value of the frequency of the clock signal based on the third weight of the combination and to generate the third control signal.

4. The apparatus of claim 3, further comprising:
a contents aware idle coordinator (CAIC) configured to provide the controller with contents information associated with contents of a task that the processor performs; and
a thermal characteristic aware idle coordinator (TCAIC) configured to provide the controller with thermal characteristic information associated with a thermal characteristic of a substrate or a system on chip in which the apparatus is implemented,
wherein the controller adjusts the first weight, the second weight, or the third weight of the combination, based on the contents information or the thermal characteristic information.

5. The apparatus of claim 4, wherein the contents information includes a kind of the task, a minimum frequency of the clock signal required to perform the task, and a duty time of the task.

6. The apparatus of claim 2, wherein the controller includes:
a throttle converting unit configured to set a target power with reference to the second look-up table, and to generate a plurality of combinations, each composed of a first weight, a second weight, and a third weight respectively corresponding to the first method, the second method, and the third method, based on a frequency and a voltage level corresponding to the target power;
a max cooling finding unit configured to determine and output a combination maximizing cooling of the processor from among the plurality of combinations;
an idle injecting unit configured to determine the state of each of the plurality of cores based on the first weight of the combination and to generate a first control signal adjusting levels of powers to be respectively provided to each of the plurality of cores;
a frequency/voltage clamping unit configured to determine a maximum value of the level of the operating voltage and a maximum value of the frequency of the clock signal based on the second weight of the combination, and to generate a second control signal adjusting the level of the operating voltage to be provided to the processor and a third control signal adjusting the frequency of the clock signal to be provided to the processor; and
a frequency clamping unit configured to determine the maximum value of the frequency of the clock signal based on the third weight of the combination and to generate the third control signal.

7. The apparatus of claim 6, further comprising:
a contents aware idle coordinator (CAIC) configured to provide the controller with contents information associated with contents of a task that the processor performs; and
a thermal characteristic aware idle coordinator (TCAIC) configured to provide the controller with thermal characteristic information associated with a thermal characteristic of a substrate or a system on chip in which the apparatus is implemented,
wherein the controller adjusts the first weight, the second weight, or the third weight of the combination, based on the contents information or the thermal characteristic information.

8. The apparatus of claim 7, wherein the contents information includes a kind of the task, a minimum frequency of the clock signal required to perform the task, and a duty time of the task.

9. The apparatus of claim 1, wherein each of the plurality of cores is one of:
a first core consuming a first power and having a first processing speed,
a second core consuming a second power less than the first power and a second processing speed slower than the first processing speed, or
a third core consuming a third power less than the second power and having a third processing speed slower than the second processing speed.

10. A method for dynamic thermal management, comprising:
  determining whether there is a need to perform thermal management on a processor based on temperatures measured from a plurality of temperature sensors included in the processor;
  outputting an indication signal based on the determination; and
  performing the thermal management on the processor in response to the indication signal, by using at least one of the following methods: a first method of adjusting a state of each of a plurality of cores included in the processor, a second method of adjusting a level of an operating voltage and a frequency of a clock signal, which are provided to the processor, and a third method of adjusting only the frequency of the clock signal to be provided to the processor,
  wherein each of the plurality of cores is in a wake-up state or an idle state, and
  wherein the thermal management methods used by the controller are based on a priority setting of the controller, the priority setting including a preferentially maximize performance setting and a preferentially maximize cooling setting.

11. The method of claim 10, wherein the performing of the thermal management on the processor includes:
  setting a target temperature based on a first look-up table storing a max power budget of the processor corresponding to information associated with the temperatures;
  generating a plurality of combinations, each composed of a first weight, a second weight, and a third weight respectively corresponding to the first method, the second method, and the third method, based on the target temperature;
  determining and outputting a combination maximizing performance of the processor from among the plurality of combinations; and
  adjusting levels of powers to be provided to each of the plurality of cores, adjusting the level of the operating voltage to be provided to the processor, or the frequency of the clock signal to be provided to the processor, based on the combination.

12. The method of claim 11, wherein the adjusting includes:
  determining the state of each of the plurality of cores based on the first weight of the combination, and increasing or decreasing the levels of the powers to be respectively provided to each of the plurality of cores based on the determined states;
  determining a maximum value of the level of the operating voltage and a maximum value of the frequency of the clock signal based on the second weight of the combination, adjusting the operating voltage to be provided to the processor, and adjusting the frequency of the clock signal to be provided to the processor; and
  determining the maximum value of the frequency of the clock signal based on the third weight of the combination and adjusting the frequency of the clock signal to be provided to the processor based on the determined maximum value of the frequency.

13. The method of claim 12, further comprising:
  adjusting the first weight, the second weight, or the third weight of the combination, based on contents information associated with contents of a task that the processor performs, or based on thermal characteristic information associated with a thermal characteristic of a substrate or a system on chip in which an apparatus for dynamic thermal management is implemented.

14. The method of claim 10, wherein the performing of the thermal management on the processor includes:
  setting a target power based on a second look-up table storing a max power budget of the processor corresponding to the level of the operating voltage and the frequency of the clock signal;
  generating a plurality of combinations each composed of a first weight, a second weight, and a third weight respectively corresponding to the first method, the second method, and the third method, based on the voltage level and a frequency corresponding to the target power;
  determining and outputting a combination maximizing cooling of the processor from among the plurality of combinations; and
  adjusting levels of powers to be respectively provided to each of the plurality of cores, adjusting the level of the operating voltage to be provided to the processor, or the frequency of the clock signal to be provided to the processor, based on the combination.

15. The method of claim 14, wherein the adjusting includes:
  determining the state of each of the plurality of cores based on the first weight of the combination to increase or decrease the levels of the powers to be respectively provided to each of the plurality of cores;
  determining a maximum value of the level of the operating voltage and a maximum value of the frequency of the clock signal based on the second weight of the combination, adjusting the level of the operating voltage to be provided to the processor, and increasing or decreasing the frequency of the clock signal to be provided to the processor; and
  determining the maximum value of the frequency of the clock signal based on the third weight of the combination and increasing or decreasing the frequency of the clock signal to be provided to the processor.

16. The method of claim 15, further comprising:
  adjusting the first weight, the second weight, or the third weight of the combination, based on contents information associated with contents of a task that the processor performs or thermal characteristic information associated with a thermal characteristic of a substrate or system on chip in which an apparatus for dynamic thermal management is implemented.

17. A mobile device comprising:
  a processor including a plurality of cores and a plurality of temperature sensors;
  a thermal management unit configured to determine whether there is a need to perform thermal management on the processor based on temperatures measured from the plurality of temperature sensors, and to generate an indication signal based on the indication;
  a power management unit configured to provide powers to the plurality of cores, respectively;
  a power management integrated circuit (PMIC) configured to provide an operating voltage to the processor;
  a clock management unit configured to provide a clock signal to the processor; and
  a controller configured to perform the thermal management on the processor in response to the indication signal, wherein the controller is configured to execute a first method for adjusting a state of each of the plurality of cores included in the processor, a second method for adjusting a level of an operating voltage and a frequency of a clock signal, or a third method for adjusting only the frequency of the clock signal, wherein the controller performs the thermal management using at least one of the first, second, or third methods, and wherein each of the plurality of cores is in a wake-up state or an idle state, and wherein each of the plurality of cores is one of:
a first core consuming a first power and having a first processing speed,
a second core consuming a second power less than the first power and a second processing speed slower than the first processing speed, or
a third core consuming a third power less than the second power and having a third processing speed slower than the second processing speed.

18. The mobile device of claim 17, wherein the controller includes:
a first look-up table configured to store a max power budget of the processor corresponding to information about the temperatures; and
a second look-up table configured to store a max power budget of the processor corresponding to the level of the operating voltage and the frequency of the clock signal,
wherein the information about the temperatures is a highest temperature, a lowest temperature, or an average temperature of the temperatures.

19. The mobile device of claim 18, wherein the controller includes:
a throttle composing unit configured to set a target temperature with reference to the first look-up table, and to generate a plurality of combinations, each composed of a first weight, a second weight, and a third weight respectively corresponding to the first method, the second method, and the third method, based on the target temperature;
a max performance finding unit configured to determine and output a combination maximizing performance of the processor from among the plurality of combinations;
an idle injecting unit configured to set the state of each of the plurality of cores based on the first weight of the combination and to generate a first control signal;
a frequency/voltage clamping unit configured to determine a maximum value of the level of the operating voltage and a maximum value of the frequency of the clock signal based on the second weight of the combination, and to generate a second control signal and a third control signal; and
a frequency clamping unit configured to determine the maximum value of the frequency of the clock signal based on the third weight of the combination and to generate the third control signal,
wherein the power management unit adjusts levels of the powers to be respectively provided to each of the plurality of cores in response to the first control signal;
wherein the PMIC adjusts the level of the operating voltage to be provided to the processor in response to the second control signal; and
wherein the clock management unit adjusts the frequency of the clock signal to be provided to the processor in response to the third control signal.

20. The mobile device of claim 18, wherein the controller includes:
a throttle converting unit configured to set a target power based on the second look-up table, and to generate a plurality of combinations, each composed of a first weight, a second weight, and a third weight respectively corresponding to the first method, the second method, and the third method, based on a frequency and a voltage level corresponding to the target power;
a max cooling finding unit configured to determine and output a combination maximizing cooling of the processor from among the plurality of combinations;
an idle injecting unit configured to determine the state of each of the plurality of cores based on the first weight of the combination and to generate a first control signal;
a frequency/voltage clamping unit configured to determine a maximum value of the level of the operating voltage and a maximum value of the frequency of the clock signal based on the second weight of the combination and to generate a second control signal and a third control signal; and
a frequency clamping unit configured to determine the maximum value of the frequency of the clock signal based on the third weight of the combination and to generate the third control signal,
wherein the power management unit adjusts levels of the powers to be provided to each of the plurality of cores in response to the first control signal;
wherein the PMIC adjusts the level of the operating voltage to be provided to the processor in response to the second control signal; and
wherein the clock management unit adjusts the frequency of the clock signal to be provided to the processor in response to the third control signal.

* * * * *